US011936126B2

(12) United States Patent
Tan et al.

(10) Patent No.: US 11,936,126 B2
(45) Date of Patent: Mar. 19, 2024

(54) TERMINAL AND RECEPTACLE CONNECTOR

(71) Applicant: MOLEX, LLC, Lisle, IL (US)

(72) Inventors: Hien-Hwee Tan, Jurong Town (SG); Yueh-Ting Chiang, New Taipei (TW); Yao-Ting Wang, New Taipei (TW)

(73) Assignee: Molex, LLC, Lisle, IL (US)

(*) Notice: Subject to any disclaimer, the term of this patent is extended or adjusted under 35 U.S.C. 154(b) by 343 days.

(21) Appl. No.: 17/522,919

(22) Filed: Nov. 10, 2021

(65) Prior Publication Data

US 2022/0166158 A1 May 26, 2022

(30) Foreign Application Priority Data

Nov. 26, 2020 (CN) ........................ 202011347224.1

(51) Int. Cl.
*H01R 12/71* (2011.01)
*H01R 12/70* (2011.01)
*H01R 13/627* (2006.01)
*H01R 43/02* (2006.01)

(52) U.S. Cl.
CPC ....... *H01R 12/707* (2013.01); *H01R 13/6273* (2013.01); *H01R 43/0256* (2013.01)

(58) Field of Classification Search
CPC .............. H01R 12/707; H01R 13/6273; H01R 43/0256; H01R 12/716; H01R 13/2407; H01R 12/57; H01R 13/02; H01R 13/40; H01R 13/6471; H01R 13/652
See application file for complete search history.

(56) References Cited

U.S. PATENT DOCUMENTS

| | | | | |
|---|---|---|---|---|
| 6,454,588 B1 * | 9/2002 | Pickles | H05K 7/1007 | 439/862 |
| 6,478,598 B1 * | 11/2002 | Szu | H01R 12/57 | 439/857 |
| 6,554,633 B1 * | 4/2003 | Nobuyuki | H01R 13/193 | 439/259 |
| 6,561,831 B1 * | 5/2003 | McHugh | H01R 12/57 | 439/83 |
| 6,652,294 B1 * | 11/2003 | Zhang | H01R 12/57 | 439/736 |

(Continued)

FOREIGN PATENT DOCUMENTS

| | | |
|---|---|---|
| JP | 2007501498 A | 1/2007 |
| TW | M253128 U | 12/2004 |

(Continued)

*Primary Examiner* — Abdullah A Riyami
*Assistant Examiner* — Nelson R. Burgos-Guntin

(57) ABSTRACT

A terminal and a receptacle connector are provided. The terminal comprises a soldering segment, an upright arm and a bending arm. The soldering segment has a first end portion and the upright arm extends upwardly from the first end portion. The bending arm bends back and obliquely extends upwardly close to the upright arm and includes an upper bending segment and a contact segment extends upwardly from the upper bending segment. A shoulder portion is formed at each of at least one side edge of two side edges of each of at least one of the upright arm and the bending arm, the two side edges are connected with the soldering segment, the shoulder portion protrudes relative to a corresponding side edge of the soldering segment.

20 Claims, 15 Drawing Sheets

(56) References Cited

U.S. PATENT DOCUMENTS

| | | | | | |
|---|---|---|---|---|---|
| 8,172,591 | B2 * | 5/2012 | Wertz | H01R 12/718 | 439/246 |
| 8,974,257 | B1 * | 3/2015 | Xie | H01R 12/57 | 439/862 |
| 9,130,321 | B2 * | 9/2015 | Chang | H01R 12/716 | |
| 9,917,386 | B1 * | 3/2018 | Ju | H01R 4/027 | |
| 9,954,312 | B1 * | 4/2018 | Ju | H01R 12/707 | |
| 2004/0102062 | A1 * | 5/2004 | Liao | H05K 7/1069 | 439/66 |
| 2004/0180559 | A1 * | 9/2004 | Harasawa | H01R 12/7082 | 439/17 |
| 2005/0124198 | A1 * | 6/2005 | Ma | H01R 13/41 | 439/331 |
| 2006/0166561 | A1 * | 7/2006 | Ma | H01R 24/78 | 439/668 |
| 2006/0234557 | A1 * | 10/2006 | Chen | H04N 23/57 | 439/607.19 |
| 2007/0117473 | A1 * | 5/2007 | Uchida | G06K 7/0021 | 439/862 |
| 2008/0070447 | A1 * | 3/2008 | Deng | H01R 12/57 | 439/626 |
| 2008/0160806 | A1 * | 7/2008 | Ma | H01R 12/89 | 439/153 |
| 2008/0220627 | A1 * | 9/2008 | Liao | H01R 12/716 | 439/259 |
| 2008/0233810 | A1 * | 9/2008 | Chuang | H01R 13/2442 | 439/884 |
| 2009/0298343 | A1 * | 12/2009 | Wu | H01R 13/2464 | 439/627 |
| 2010/0173540 | A1 * | 7/2010 | Lee | H01R 12/57 | 439/861 |
| 2011/0034070 | A1 * | 2/2011 | Liao | H01R 27/00 | 439/525 |
| 2011/0250794 | A1 * | 10/2011 | Yeh | H01R 13/41 | 439/660 |
| 2012/0058691 | A1 * | 3/2012 | Ju | H01R 13/111 | 439/751 |
| 2012/0225586 | A1 * | 9/2012 | Tsai | H01R 13/2442 | 439/626 |
| 2014/0038438 | A1 * | 2/2014 | Chang | H05K 7/1069 | 439/76.1 |
| 2015/0111434 | A1 * | 4/2015 | Tagawa | H01R 13/2442 | 439/626 |
| 2016/0013572 | A1 * | 1/2016 | Yukutake | H01R 12/7047 | 439/78 |
| 2016/0261057 | A1 * | 9/2016 | Ju | H01R 12/716 | |
| 2016/0315406 | A1 * | 10/2016 | Xiao | H01R 12/716 | |
| 2017/0214160 | A1 * | 7/2017 | Deng | H01R 13/2407 | |
| 2018/0198219 | A1 * | 7/2018 | Ju | H01R 13/112 | |
| 2018/0212347 | A1 * | 7/2018 | Chang | H01R 13/518 | |
| 2018/0351297 | A1 * | 12/2018 | Suzuki | H01R 13/2492 | |
| 2018/0375243 | A1 * | 12/2018 | Hsu | H01R 13/245 | |
| 2019/0181579 | A1 * | 6/2019 | Ju | H01R 13/502 | |

FOREIGN PATENT DOCUMENTS

| | | | |
|---|---|---|---|
| TW | M258461 | U | 3/2005 |
| WO | 2019245153 | A1 | 12/2019 |

* cited by examiner

TERMINAL AND RECEPTACLE CONNECTOR

RELATED APPLICATION

This application claims priority to Chinese Application Serial No. 202011347224.1, filed on Nov. 26, 2020, which is incorporated herein by reference in its entirety.

TECHNICAL FIELD

The present disclosure relates to a terminal and a receptacle connector.

BACKGROUND ART

PCT application international publication No. WO2019/245153A1 discloses a plate spring-type connecting pin, the plate spring-type connecting pin has a support pin which extends in a vertical direction, a plate spring which is spaced apart from the support pin by a predetermined spacing and a bridge which connects the support pin and the plate spring. The support pin has a lip portion which is positioned at an upper end of the support pin and is bent, a first base portion which is positioned at a lower end of the support pin and locking protruding portions which are close to the lip portion and protrude toward two sides respectively. The plate spring has an upper probe portion which extends in a direction perpendicular to the lip portion, a second base portion provided at a height which is the same as a height of the first base portion, a V-shaped portion which is provided between the upper probe portion and the second base portion, an upper bending portion which connects an upper end of the V-shaped portion and a lower end of the upper probe portion and a lower bending portion which connects a lower end of the V-shaped portion and an upper end of the second base portion. The bridge bends at a lower end of the first base portion and a lower end of the second base portion to connect the first base portion and the second base portion and acts as a lower probe of the plate spring-type connecting pin. The plate spring-type connecting pin is engaged with the inside of an insulative housing by the locking protruding portions to help to fix a position of the support pin.

When the plate spring-type connecting pin is provided to the insulative housing, because positions of the locking protruding portions are higher than a position of the first base portion and a position of the second base portion and are close to the lip portion, positioning of the plate spring-type connecting pin is less stable, when the upper probe portion of the plate spring is pressed down by a mated conductive pad, the upper probe portion easily shakes, and in turn stability of an electrical connection is affected.

Moreover, because an electrical connector needs to meet low profile and can conform to electrical requirement for high speed transferring, how to promote signal integrity (abbreviated as SI) when the terminal and the electrical connector transfer a signal also is a subject which needs to be improved.

SUMMARY

Accordingly, in some embodiments, a terminal of the present disclosure comprises a soldering segment, an upright arm and a bending arm. The soldering segment has a first end portion and a second end portion which are respectively positioned at opposite two ends and extend upwardly. The upright arm extends upwardly from the first end portion. The bending arm has an abutting segment which extends upwardly from the second end portion, a lower bending segment which bends and obliquely extends upwardly from the abutting segment away from the upright arm, an elastic bending segment which first extends from the lower bending segment away from the upright arm and then bends back and obliquely extends upwardly close to the upright arm, an upper bending segment which bends and extends upwardly from the elastic bending segment and a contact segment which extends upwardly from the upper bending segment. A shoulder portion is formed at each of at least one side edge of two side edges of each of at least one of the upright arm and the bending arm, the two side edges are connected with the soldering segment, the shoulder portion protrudes relative to a corresponding side edge of the soldering segment.

In some embodiments, the shoulder portion is formed at each of the two side edges of each of the at least one of the upright arm and the bending arm, the two side edges are connected with the soldering segment, the shoulder portion protrudes relative to the corresponding side edge of the soldering segment.

In some embodiments, the shoulder portion is formed at each of the at least one side edge of the two side edges of each of the upright arm and the bending arm, the two side edges are connected with the soldering segment, the shoulder portion protrudes relative to the corresponding side edge of the soldering segment.

In some embodiments, the shoulder portion is formed at each of the two side edges of each of the upright arm and the bending arm, the two side edges are connected with the soldering segment, the shoulder portion protrudes relative to the corresponding side edge of the soldering segment.

In some embodiments, the contact segment is positioned above the upright arm and makes the upper bending segment contact the upright arm when the contact segment is pressed down to move downwardly.

In some embodiments, a tip of the upright arm obliquely extends upwardly away from the bending arm to form an oblique end portion which allows the upper bending segment to press against when the upper bending segment is pressed down.

In some embodiments, a width of the oblique end portion is larger than a width of the upper bending segment.

In some embodiments, the soldering segment further has a soldering portion connecting the first end portion and the second end portion, the soldering portion has a soldering face which faces downwardly and is used to be soldered with a tin ball Another object of the present disclosure is to provide a receptacle connector which may solve the aforementioned problem.

Accordingly, in some embodiments, a receptacle connector of the present disclosure comprises an insulative housing and a plurality of terminals. The insulative housing has a bottom face, a top face opposite to the bottom face and a plurality of terminal grooves, each terminal groove has a positioning groove portion which penetrates the bottom face and the top face and an accommodating groove portion which extends transversely from the positioning groove portion and penetrates the top face. And a wall face which defines the positioning groove portion comprises two first side wall faces which face each other and are spaced apart from each other, a second side wall face which connects one side of each of the two the first side wall faces and a third side wall face which connects the two first side wall face, faces the second side wall face and is spaced apart from the second side wall face. At least one of the two first side wall faces form a step portion, which protrudes, at a position where the at least one of the two first side wall faces is close to the bottom face, a height of the third side wall face is lower than a height of the second side wall face so as to make the positioning groove portion and the accommodating groove portion communicated with each other. A wall face which defines the accommodating groove portion comprises a bottom wall face which faces the top face and is connected with the third side wall face, and the bottom wall face forms a protruding portion at a position where the bottom wall face is adjacent to the third side wall face. The plurality of terminals respectively are provided to the plurality of terminal grooves. Each terminal comprises a soldering segment adjacent to the bottom face and a bending arm, the bending arm has an abutting segment which extends upwardly from one end of the soldering segment and is adjacent to the third side wall face, a lower bending segment which bends and obliquely extend upwardly from the abutting segment toward the accommodating groove portion and is close to the protruding portion, an elastic bending segment which first extends from the lower bending segment away from the second side wall face and then bends back and obliquely extends upwardly close to the second side wall face, an upper bending segment which bends and extend upwardly from the elastic bending segment and a contact segment which extends upwardly from the upper bending segment. A shoulder portion which protrudes relative to a corresponding side edge of the soldering segment is formed to each of at least one side edge of two side edges of the abutting segment which are connected with the soldering segment, and the shoulder portion presses against the corresponding step portion to be positioned.

In some embodiments, the two first side wall faces each form one step portion, which protrudes, at a position where each of the two first side wall faces is close to the bottom face, the shoulder portion which protrudes relative to the corresponding side edge of the soldering segment is formed to each of the two side edges of the abutting segment which are connected with the soldering segment, and the shoulder portions press against the corresponding step portions respectively to be positioned.

In some embodiments, each terminal further comprises an upright arm which extends upwardly from the other end of the soldering segment and is adjacent to the second side wall face.

In some embodiments, a shoulder portion which protrudes relative to a corresponding side edge of the soldering segment is formed to each of at least one side edge of two side edges of the upright arm which are connected with the soldering segment, and the shoulder portion of the upright arm presses against the corresponding step portion to be positioned.

In some embodiments, the two first side wall faces each form one step portion, which protrudes, at a position where each of the two first side wall faces is close to the bottom face, the shoulder portion which protrudes relative to the corresponding side edge of the soldering segment is formed to each of the two side edges of the upright arm which are connected with the soldering segment, and the shoulder portion of the upright arm presses against the corresponding step portion to be positioned.

In some embodiments, the abutting segment of each terminal abuts against the third side wall face and the upright arm of each terminal abuts against the second side wall face so that each terminal has a preloaded force.

In some embodiments, a tip of the upright arm obliquely extends upwardly away from the bending arm to form an oblique end portion which allows the upper bending segment to press against when the upper bending segment is pressed down.

In some embodiments, a width of the oblique end portion is larger than a width of the upper bending segment.

In some embodiments, the soldering portion has a soldering face which faces downwardly and is used to be soldered with a tin ball In some embodiments, a receptacle connector of the present disclosure comprises the present disclosure and a plurality of terminals. The insulative housing has a first terminal providing portion, a second terminal providing portion and an isolation portion positioned between the first terminal providing portion and the second terminal providing portion, the first terminal providing portion, the second terminal providing portion and the isolation portion are distributed in a first direction. The plurality of terminals are distributed and provided to the first terminal providing portion, the second terminal providing portion and the isolation portion. The terminals provided to the first terminal providing portion and the terminals provided to the second terminal providing portion each comprises multiple terminal groups, each terminal group is constituted by four terminals which are arranged side by side along a second direction perpendicular to the first direction, the two terminals positioned at a middle of the four terminals act as signal terminals and the two terminals positioned at outer sides of the four terminals act as first ground terminals, the terminals provided to the isolation portion act as second ground terminals.

In some embodiments, the terminal provided to the first terminal providing portion and the terminal provided to the second terminal providing portion each are arranged as a plurality of terminal rows distributed in the first direction in which the terminals of each terminal row are arranged along the second direction, each terminal row comprises that the terminal groups are arranged along the second direction and are spaced apart from each other and positions of the terminal groups of adjacent terminal rows are staggered in the first direction, the second ground terminals provided to the isolation portion are divided into two rows, one row of the second ground terminals is adjacent to the first terminal providing portion, the other row of the second ground terminals is adjacent to the second terminal providing portion, and positions of the second ground terminals of the two rows are staggered in the first direction and each are spaced apart from the signal terminal of the terminal group which is near the corresponding second ground terminal by a certain distance.

In some embodiments, each terminal row further has one terminal acted as a third ground terminal, the third ground terminals of adjacent terminal rows are respectively positioned at two opposite end sides in the second direction and each are spaced apart from the terminal groups of the same terminal row.

The present disclosure at least has the following effect: when the terminal is provided to the insulative housing, the terminal has better stable positioning effect and has better signal integrity performance.

BRIEF DESCRIPTION OF THE DRAWINGS

Other features and effects of the present disclosure will be apparent in an embodiment referring to the accompanying drawings in which.

DETAILED DESCRIPTION OF PREFERRED EMBODIMENTS

Figure 1:
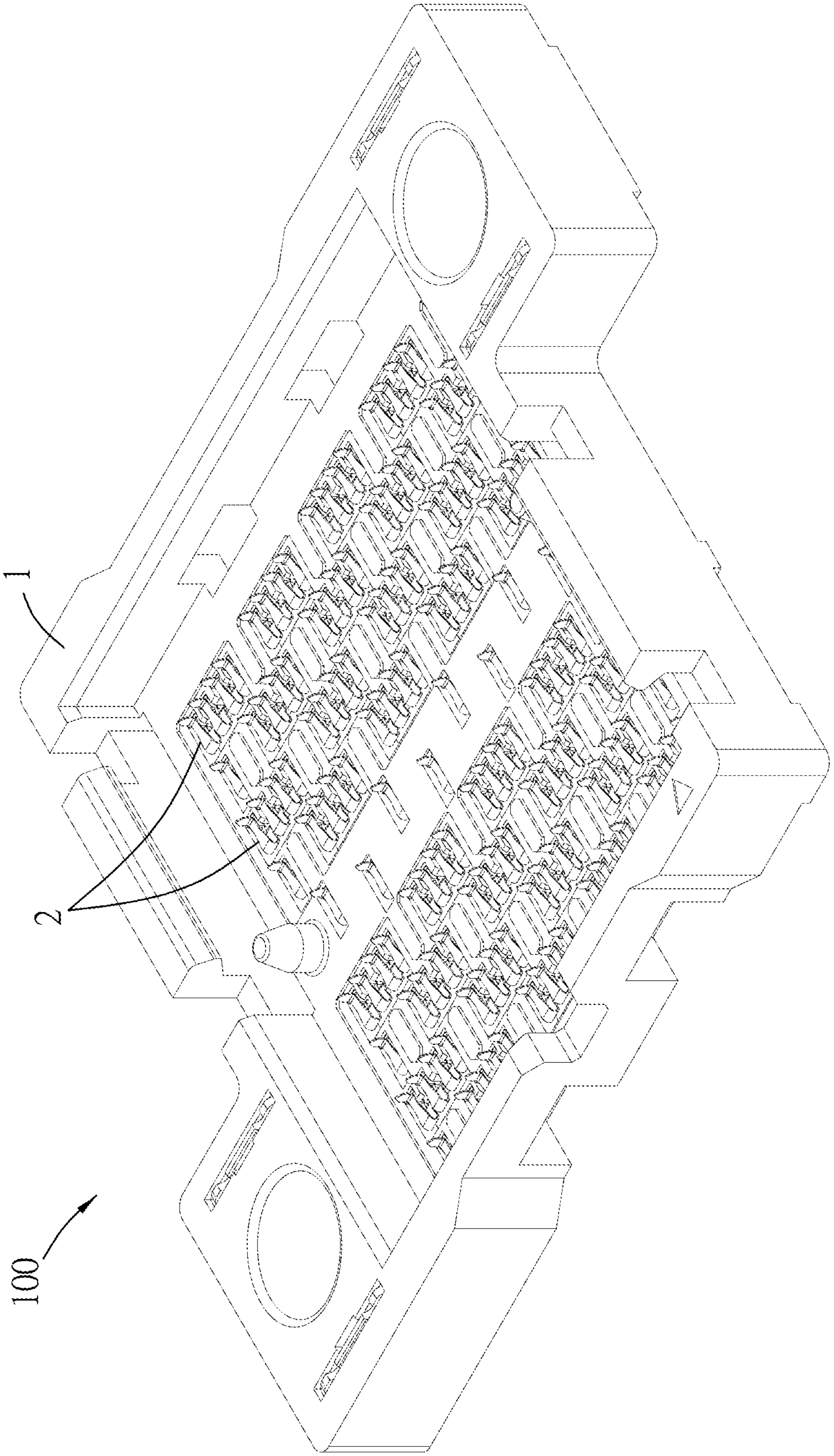
FIG. 1 is a perspective view of a first embodiment of a receptacle connector of the present disclosure.
Figure 2:
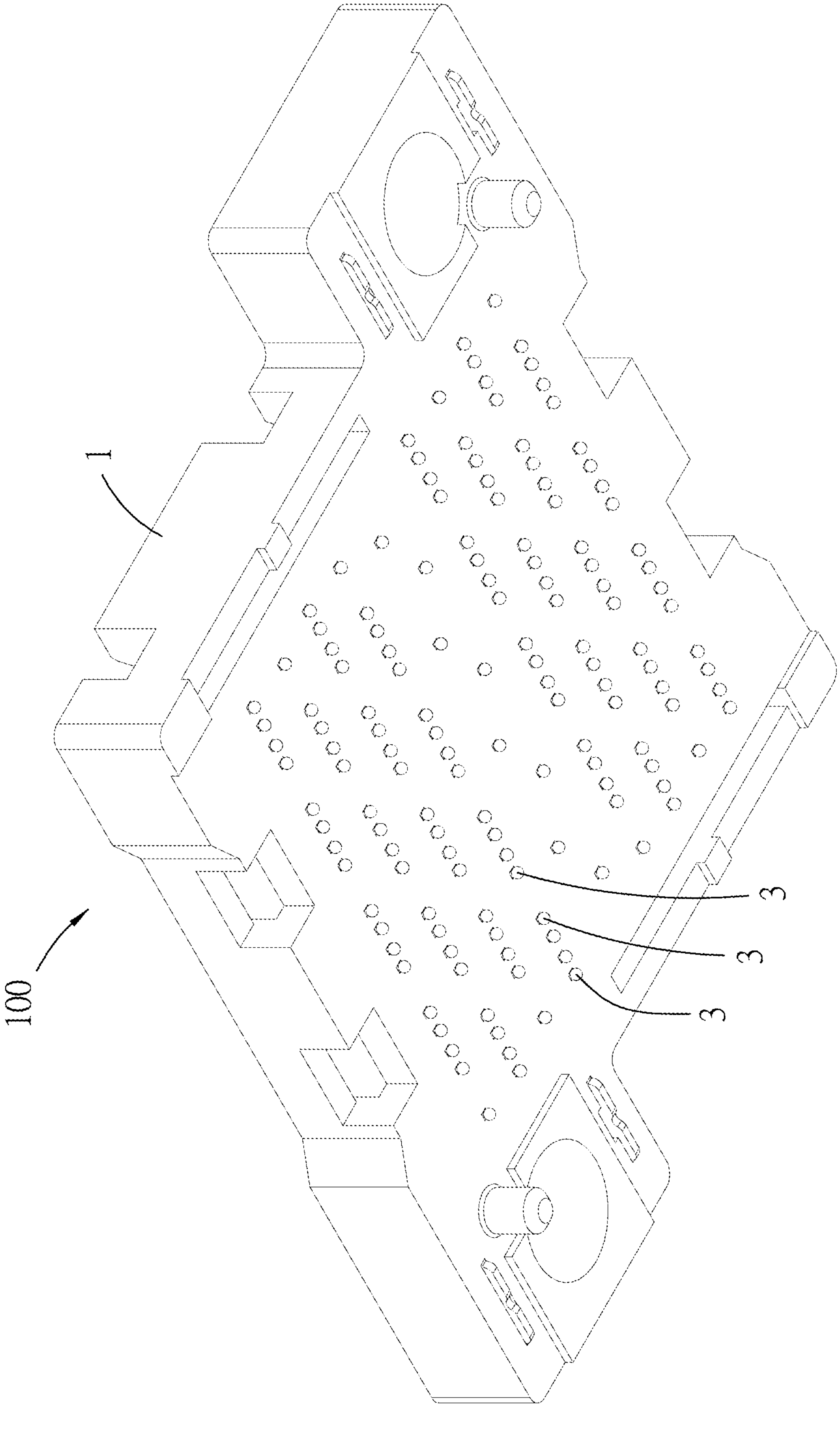
FIG. 2 is a perspective view of FIG. 1 from another angle.

Before the present disclosure is described in detail, it is noted that the similar components are indicated by the same reference numerals in the following description. The detailed description that follows describes exemplary embodiments and the features disclosed are not intended to be limited to the expressly disclosed combination(s). Therefore, unless otherwise noted, features disclosed herein may be combined together to form additional combinations that were not otherwise shown for purposes of brevity.

Referring to FIG. 1 to FIG. 4, a first embodiment of a receptacle connector 100 of the present disclosure includes an insulative housing 1 and a plurality of terminals 2 provided to the insulative housing 1.

Figure 3:
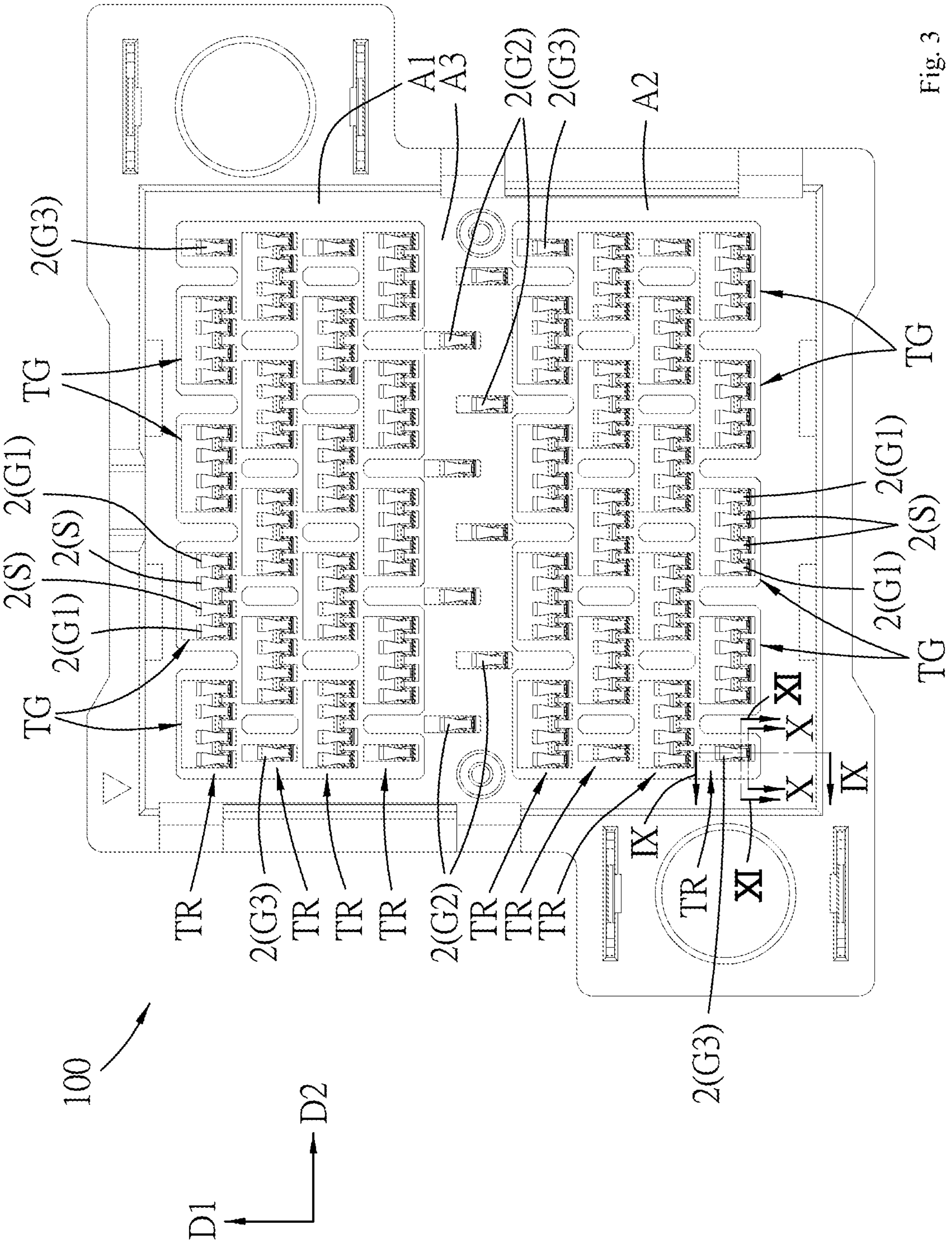
FIG. 3 is a top view of the first embodiment.
Figure 4:
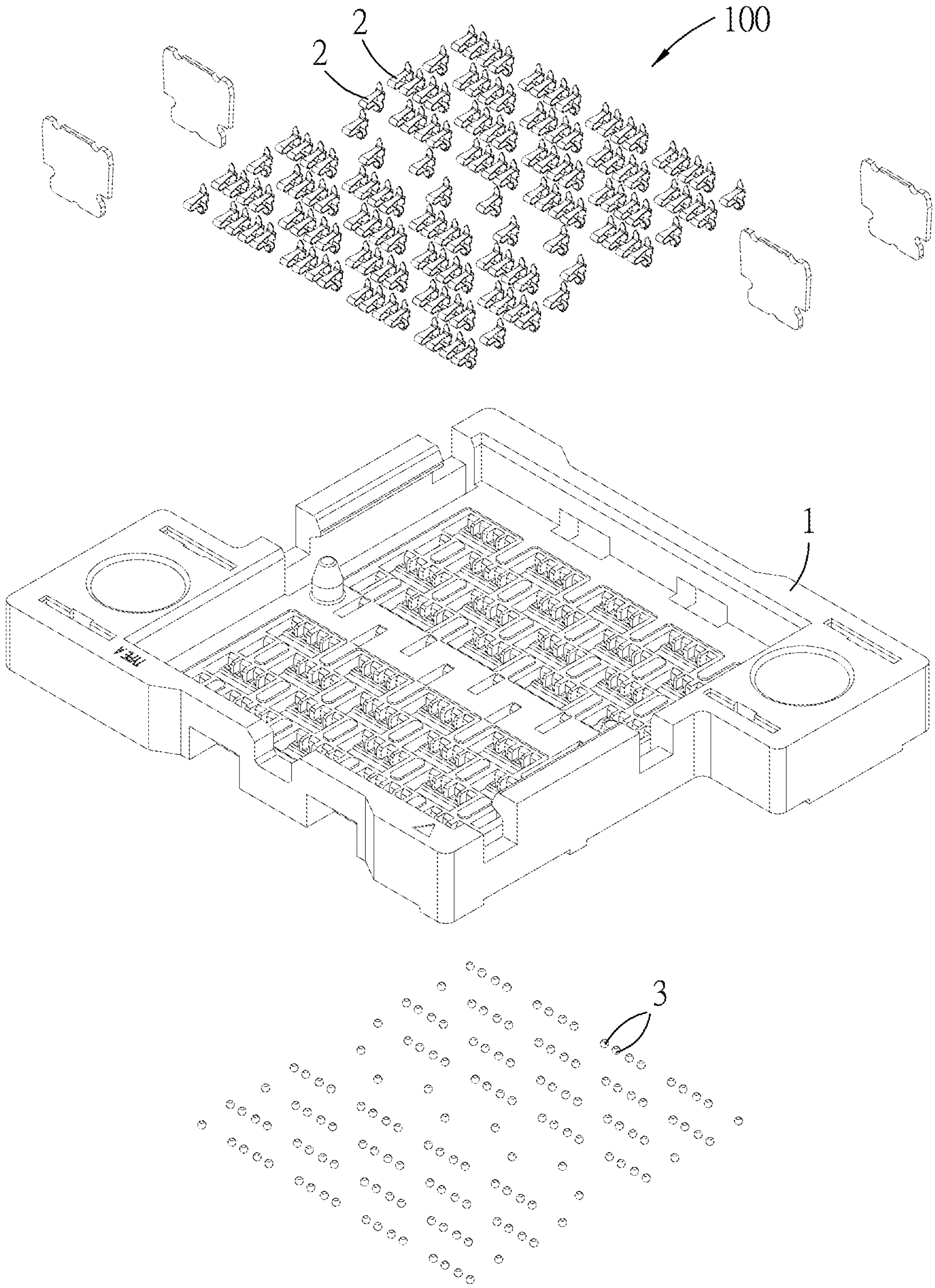
FIG. 4 is a perspective exploded view of the first embodiment.

As shown in FIG. 3, the insulative housing 1 has a first terminal providing portion A1, a second terminal providing portion A2 and an isolation portion A3 positioned between the first terminal providing portion A1 and the second terminal providing portion A2, the first terminal providing portion A1, the second terminal providing portion A2 and the isolation portion A3 are distributed in a first direction D1.

The plurality of terminals 2 are distributed and provided to the first terminal providing portion A1, the second terminal providing portion A2 and the isolation portion A3. The terminals 2 provided to the first terminal providing portion A1 and the terminals provided to the second terminal providing portion A2 each include multiple terminal groups TG, each terminal group TG is constituted by four terminals 2 which are arranged side by side along a second direction D2 perpendicular to the first direction D1, the two terminals 2 positioned at a middle of the four terminals 2 act as signal terminals S and the two terminals 2 positioned at outer sides of the four terminals 2 respectively act as first ground terminals G1. The terminals 2 provided to the isolation portion A3 act as second ground terminals G2.

In the present embodiment, the terminals 2 provided to the first terminal providing portion A1 and the terminals 2 provided to the second terminal providing portion A2 each are arranged as a plurality of terminal rows TR distributed in the first direction D1 in which the terminals 2 of each terminal row TR are arranged along the second direction D2, each terminal row TR includes that the terminal groups TG are arranged along the second direction D2 and are spaced apart from each other and positions of the terminal groups TG of adjacent terminal rows TR are staggered in the first direction D1. Each terminal row TR further has one terminal 2 acted as a third ground terminal G3, the third ground terminals G3 of adjacent terminal rows TR are respectively positioned at two opposite end sides in the second direction D2 and each are spaced apart from the terminal groups TG of the same terminal row TR. Specifically, the first terminal providing portion A1 and the second terminal providing portion A2 each are provided with four terminal rows TR, each terminal row TR has four terminal groups TG and one third ground terminal G3. The terminal groups TG of adjacent terminal rows TR are staggered in the first direction D1, so that the signal terminals S of adjacent terminal rows TR are staggered in the first direction D1, so as to make the signal terminals S of one of adjacent terminal rows TR are aligned with spacing regions between the terminal groups TG of the other of adjacent terminal rows TR in the first direction D1. The two first ground terminals G1 of each terminal group TG respectively correspond to adjacent two terminal groups TG of adjacent terminal row TR in the first direction D1 and each correspondingly positioned between adjacent signal terminal S and first ground terminal G1 of adjacent terminal row TR. Based on the directions as shown in FIG. 3, because the terminal groups TG of adjacent terminal rows TR are arranged and staggered in the first direction D1, one terminal row TR of adjacent terminal rows TR makes the terminal group TG of the one terminal row TR positioned outermost at one of a left side and a right side protrude relative to the other terminal row TR of adjacent terminal rows TR, so that, the signal terminal S and the first ground terminal G1 of the outermost terminal group TG which protrude at an outer side relative to the adjacent terminal row TR do not have the first ground terminal G1 of the adjacent terminal row TR to correspond to therebetween, thus the third ground terminal G3 of each terminal row TR is provided between the corresponding signal terminal S and the first ground terminal G1 of adjacent terminal row TR which are protrude at the outer side, such that each terminal group TG can correspond to the two ground terminals of adjacent terminal row TR, thereby avoiding the two signal terminals S of each terminal group TG being not balanced.

In the present embodiment, the terminals 2 provided to the first terminal providing portion A1 and the terminals 2 provided to the second terminal providing portion A2 are respectively used to transmit a signal and receive a signal, the first terminal providing portion A1 and the second terminal providing portion A2 are isolated from each other by the isolation portion A3, and thus can have better near end crosstalk isolation degree. Second ground terminals G2 provided to the isolation portion A3 are used to act as crosstalk blocking. Specifically, the second ground terminals G2 provided to the isolation portion A3 are divided into two rows, one row of the second ground terminals G2 is adjacent to the first terminal providing portion A1, the other row of the second around terminals G2 is adjacent to the second terminal providing portion A2, and positions of the second ground terminals G2 of the two rows are staggered in the first direction D1 and each are spaced apart from the signal terminal S of the terminal group TG which is near the corresponding second ground terminal G2 by a certain distance. Therefore, the second ground terminal G2 is away from the corresponding signal terminal S so as to avoid affecting signal integrity performance of the corresponding signal terminal S originally designed.

Figure 5:
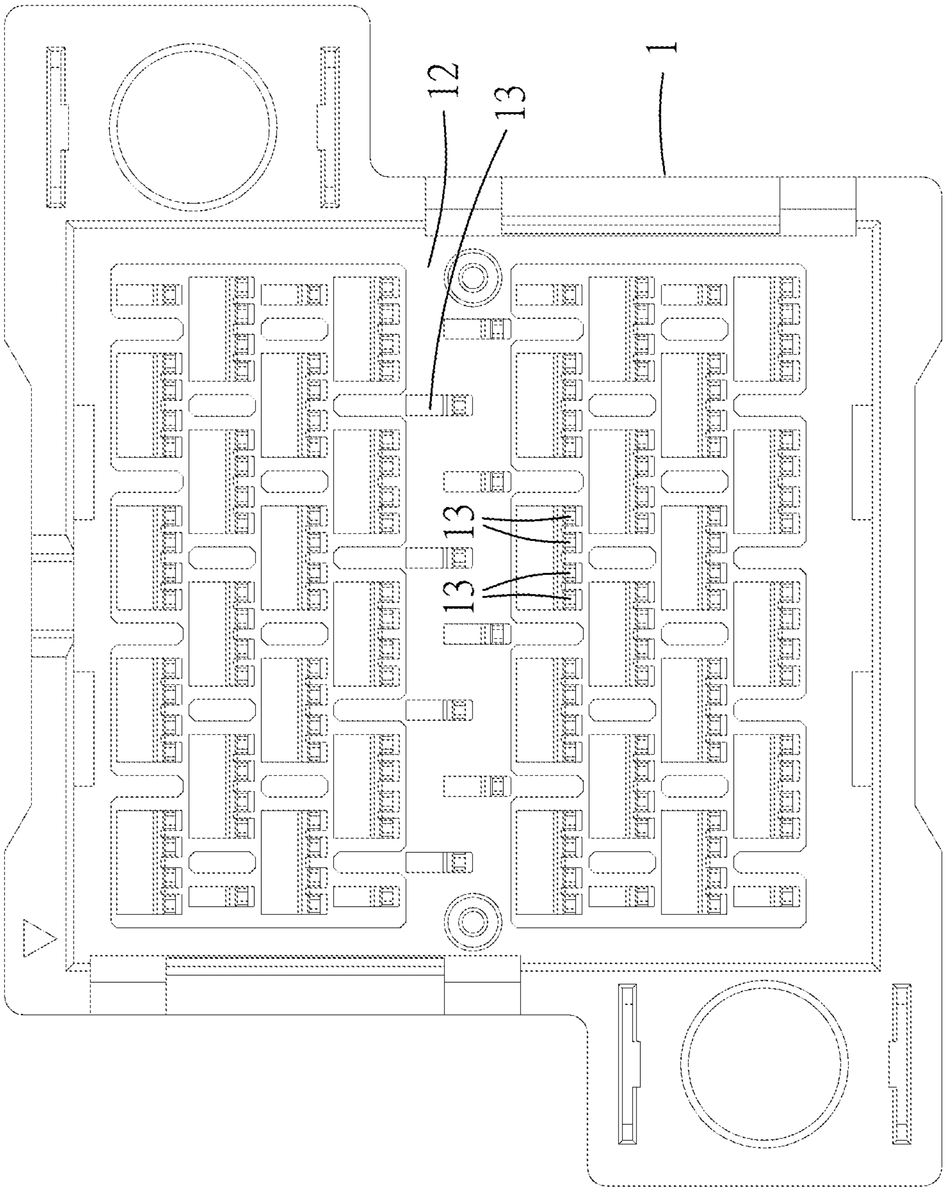
FIG. 5 is a top view of an insulative housing of the first embodiment.
Figure 6:
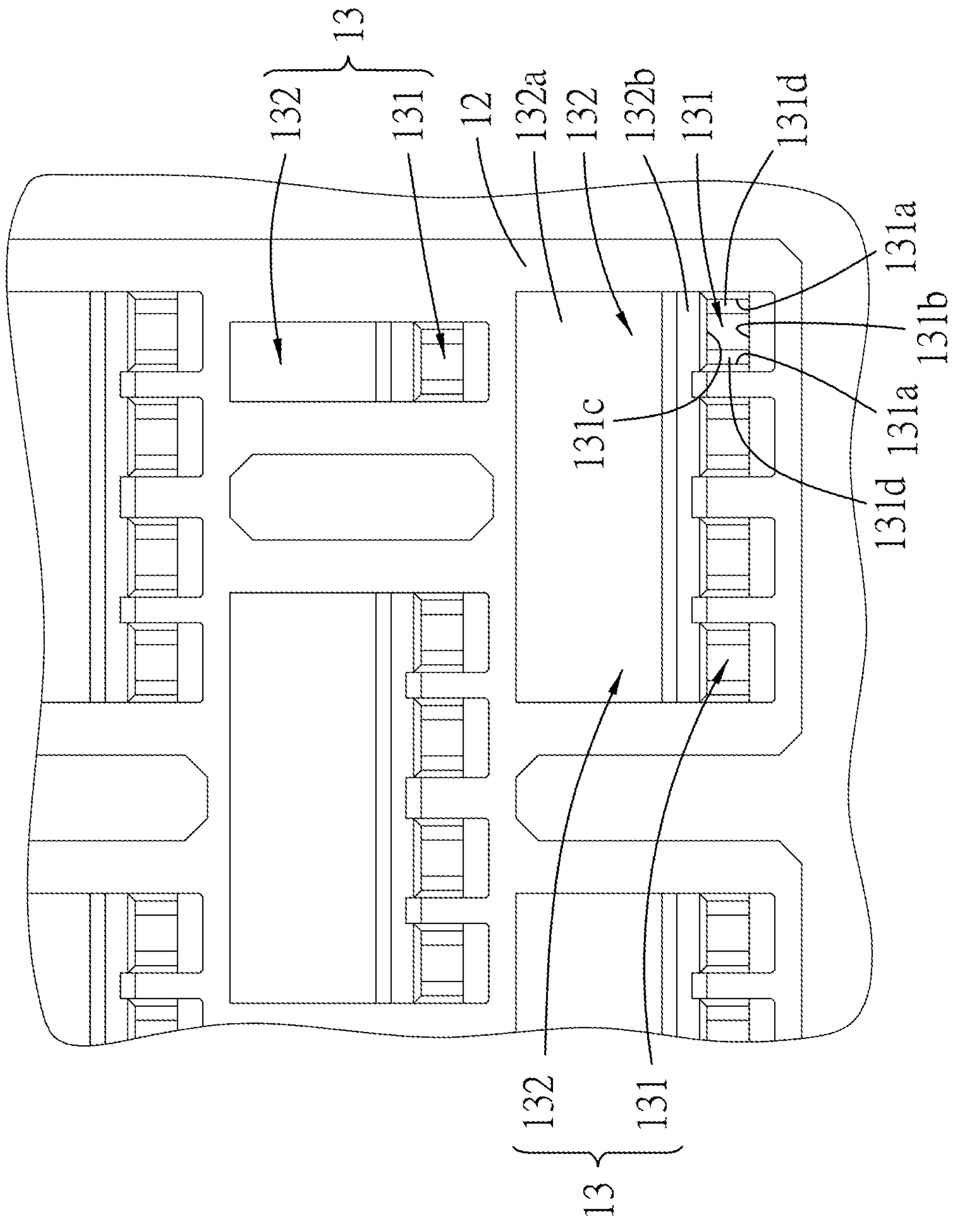
FIG. 6 is a partially enlarged view of FIG. 5.
Figure 9:
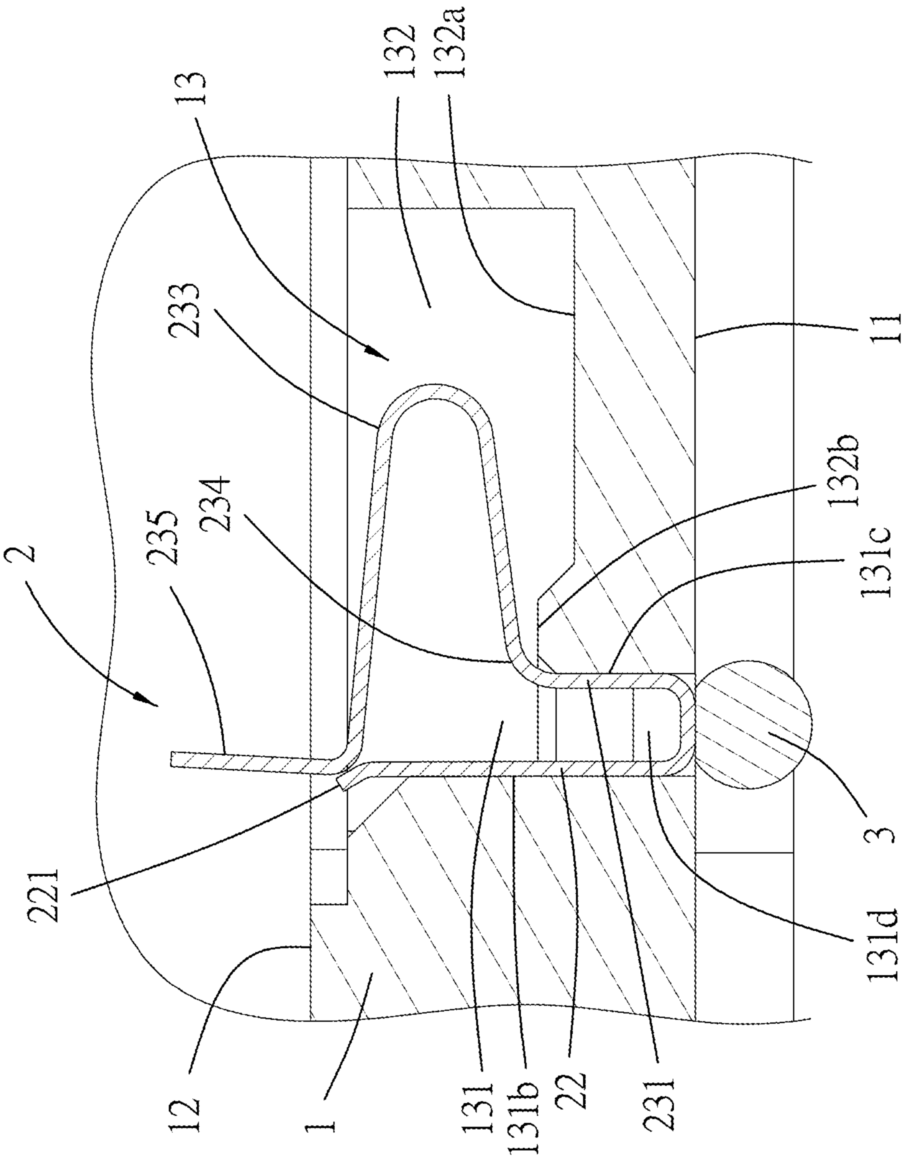
FIG. 9 is a partial cross sectional view taken along an IX-IX line of FIG. 3.

Referring to FIG. 5, FIG. 6 and FIG. 9, the insulative housing 1 has a bottom face 11, a top face 12 opposite to the bottom face 11 and a plurality of terminal grooves 13. Each terminal groove 13 is used to accommodate one terminal 2 and has a positioning groove portion 131 which penetrates the bottom face 11 and the top face 12 and an accommodating groove portion 132 which extends transversely from the positioning groove portion 131 and penetrates the top face 12. And a wall face defining the positioning groove portion 131 includes two first side wall faces 131*a* which face each other and are spaced apart from each other, a second side wall face 131*b* which connects one side of each of the two first side wall faces 131*a* and a third side wall face 131*c* which connects the two first side wall faces 131*a*, faces the second side wall face 131*b* and is spaced apart from the second side wall face 131*b*. At least one of the two first side wall faces 131*a* form a step portion 131*d*, which protrudes, at a position where the at least one of the two first side wall faces 131*a* is close to the bottom face 11, in the present embodiment, the two first side wall faces 131*a* each form a step portion 131*d*, which protrudes, at a position close to the bottom face 11. A height of the third side wall face 131*c* is lower than a height of the second side wall face 131*b* so as to make the positioning groove portion 131 and the accommodating groove portion 132 communicated with each other. A wall face defining the accommodating groove portion 132 includes a bottom wall face 132*a* which faces the top face 12 and is connected with the third side wall face 131*c*, and the bottom wall face 132*a* forms a protruding portion 132*b* at a position where the bottom wall face 132*a* is adjacent to the third side wall face 131*c*. In the present embodiment, the accommodating groove portions 132 of the four terminals grooves 13 which are used to accommodate the same terminal group TG (see FIG. 3) are communicated with each other.

Figure 7:
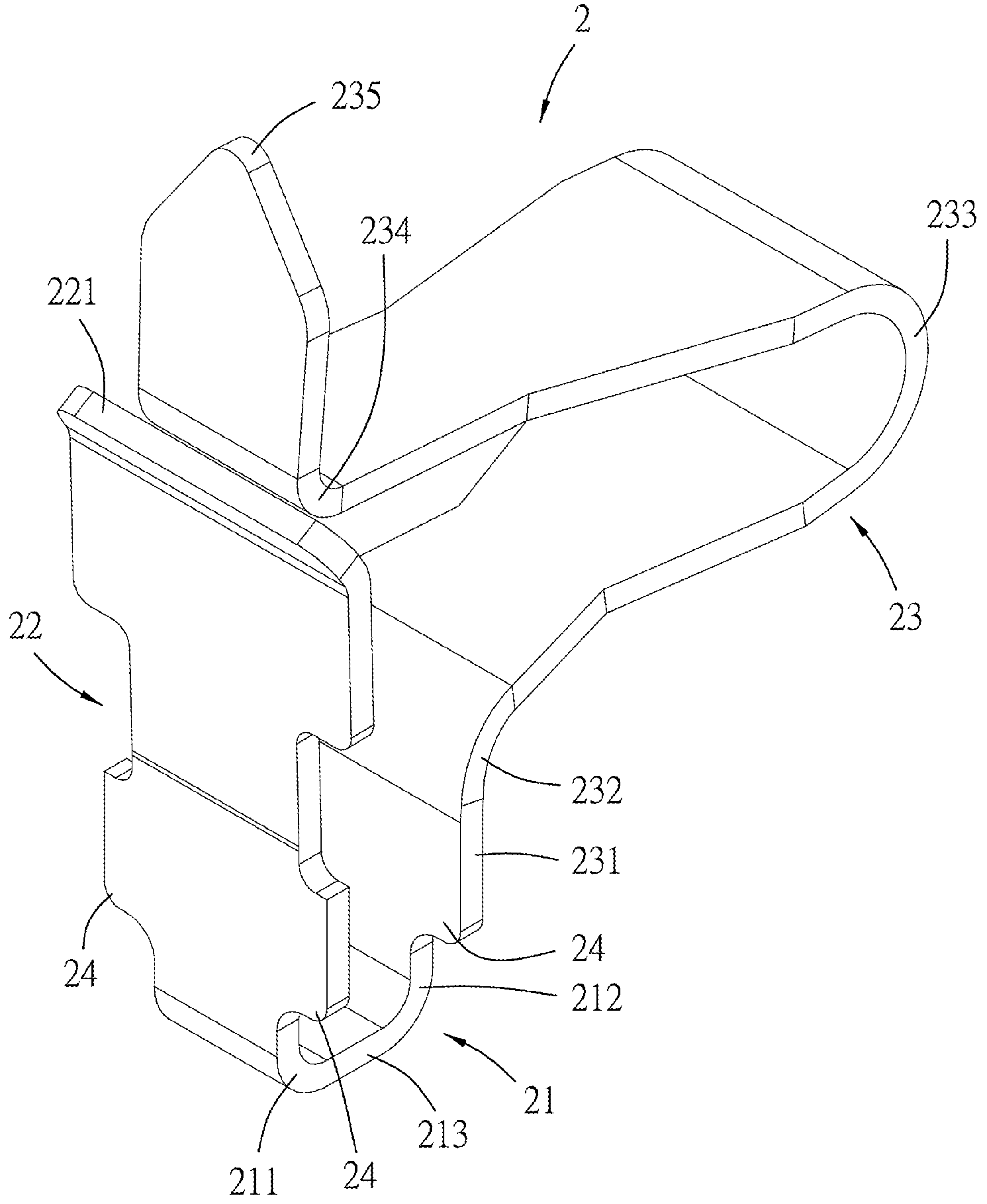
FIG. 7 is a perspective view of a terminal of the first embodiment.
Figure 8:
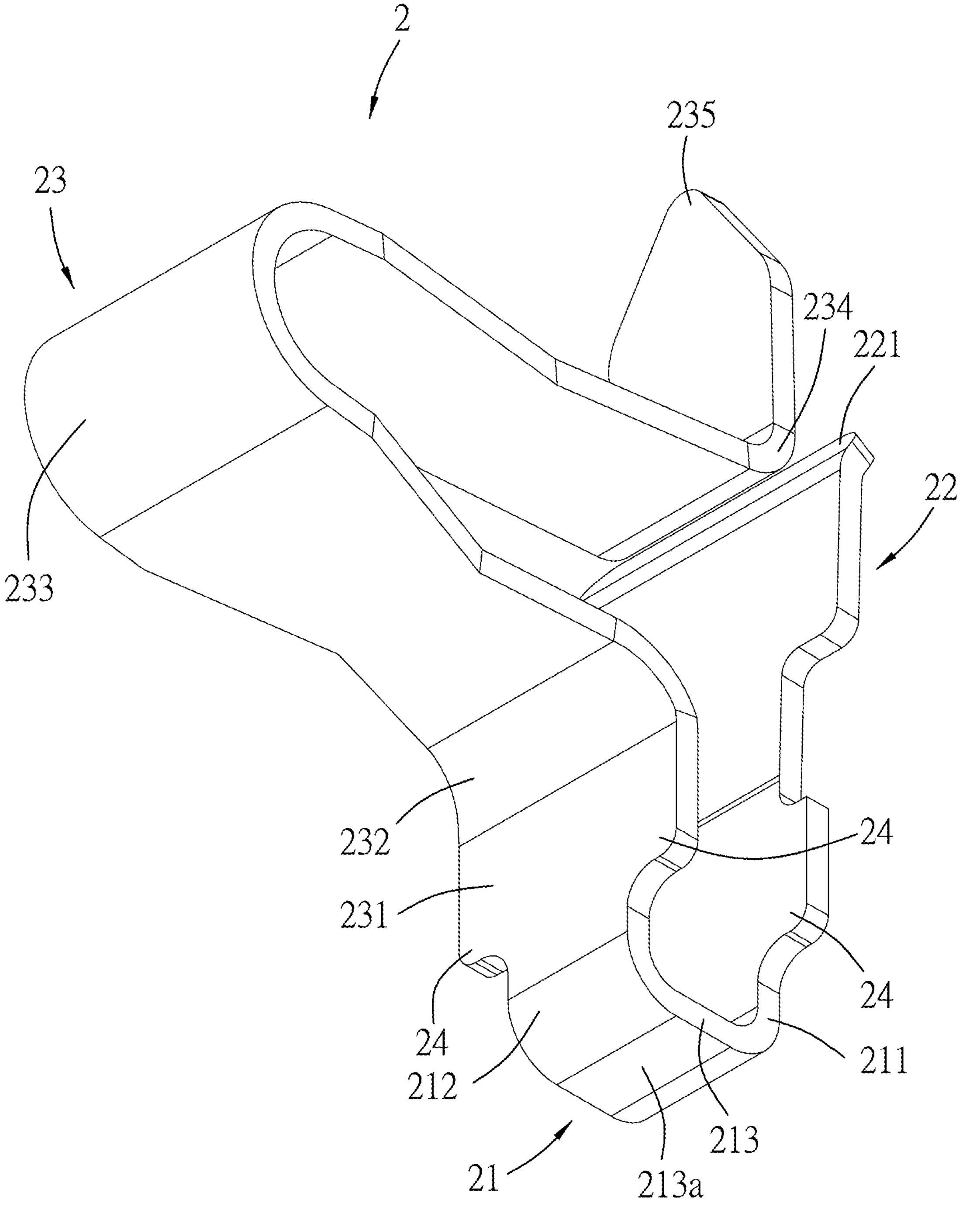
FIG. 8 is a perspective view of the terminal of the first embodiment from another angle.

Referring to FIG. 7 to FIG. 9, each terminal 2 includes a soldering segment 21, an upright arm 22 and a bending arm 23. The soldering segment 21 has a soldering portion 213 and a first end portion 211 and a second end portion 212 which are respectively positioned at opposite two ends of the soldering portion 213 and extend upwardly. The soldering portion 213 has a soldering face 213*a* which faces downwardly and is used to be soldered with a tin ball 3. The upright arm 22 extends upwardly from the first end portion 211. The bending arm 23 has an abutting segment 231 which extends upwardly from the second end portion 212, a lower bending segment 232 which bends and obliquely extends upwardly from the abutting segment 231 away from the upright arm 22, an elastic bending segment 233 which first extends from the lower bending segment 232 away from the upright arm 22 and then bends back and obliquely extends upwardly close to the upright arm 22, an upper bending segment 234 which bends and extends upwardly from the elastic bending segment 233 and a contact segment 235 which extends upwardly from the upper bending segment 234.

Figure 10:
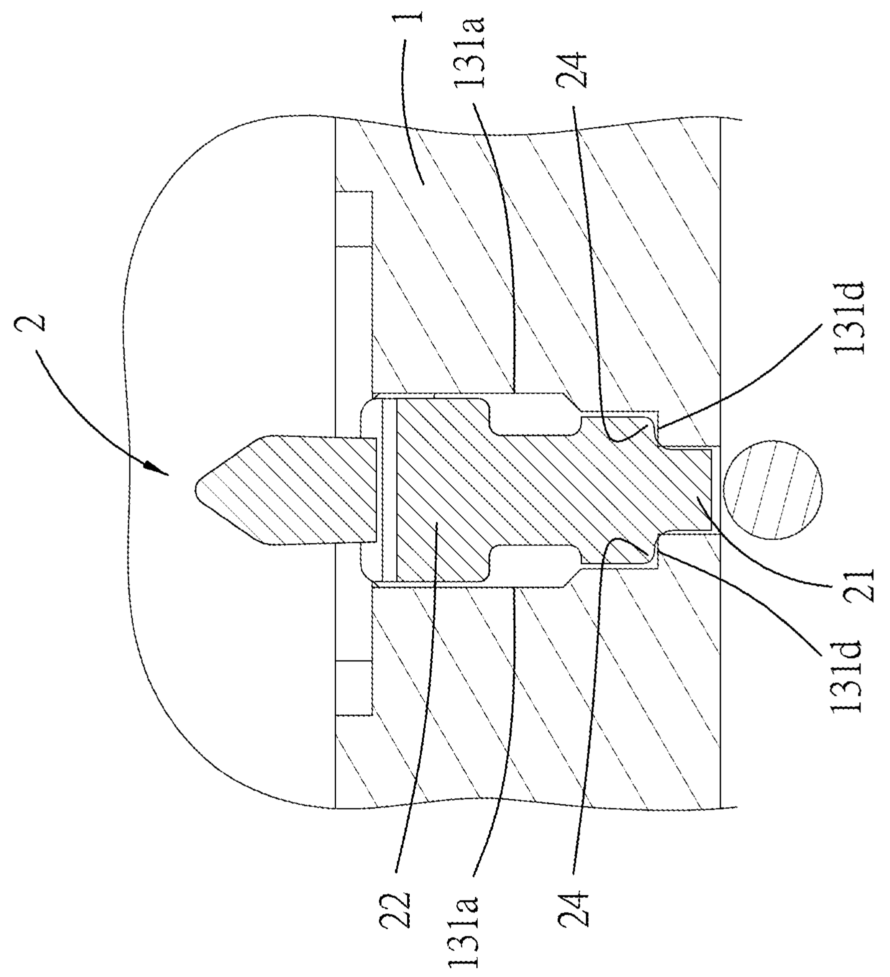
FIG. 10 is a partial cross sectional view taken along of an X-X line of FIG. 3.
Figure 11:
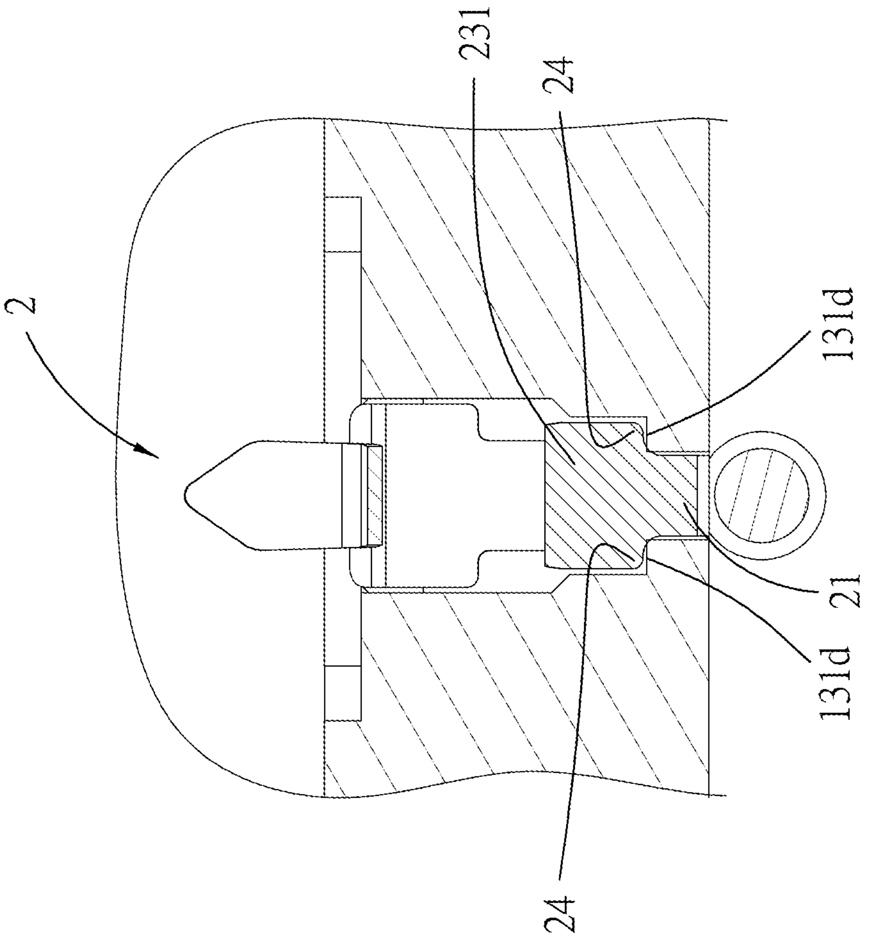
FIG. 11 is a partial cross sectional view taken along an XI-XI line of FIG. 3.
Figure 12:
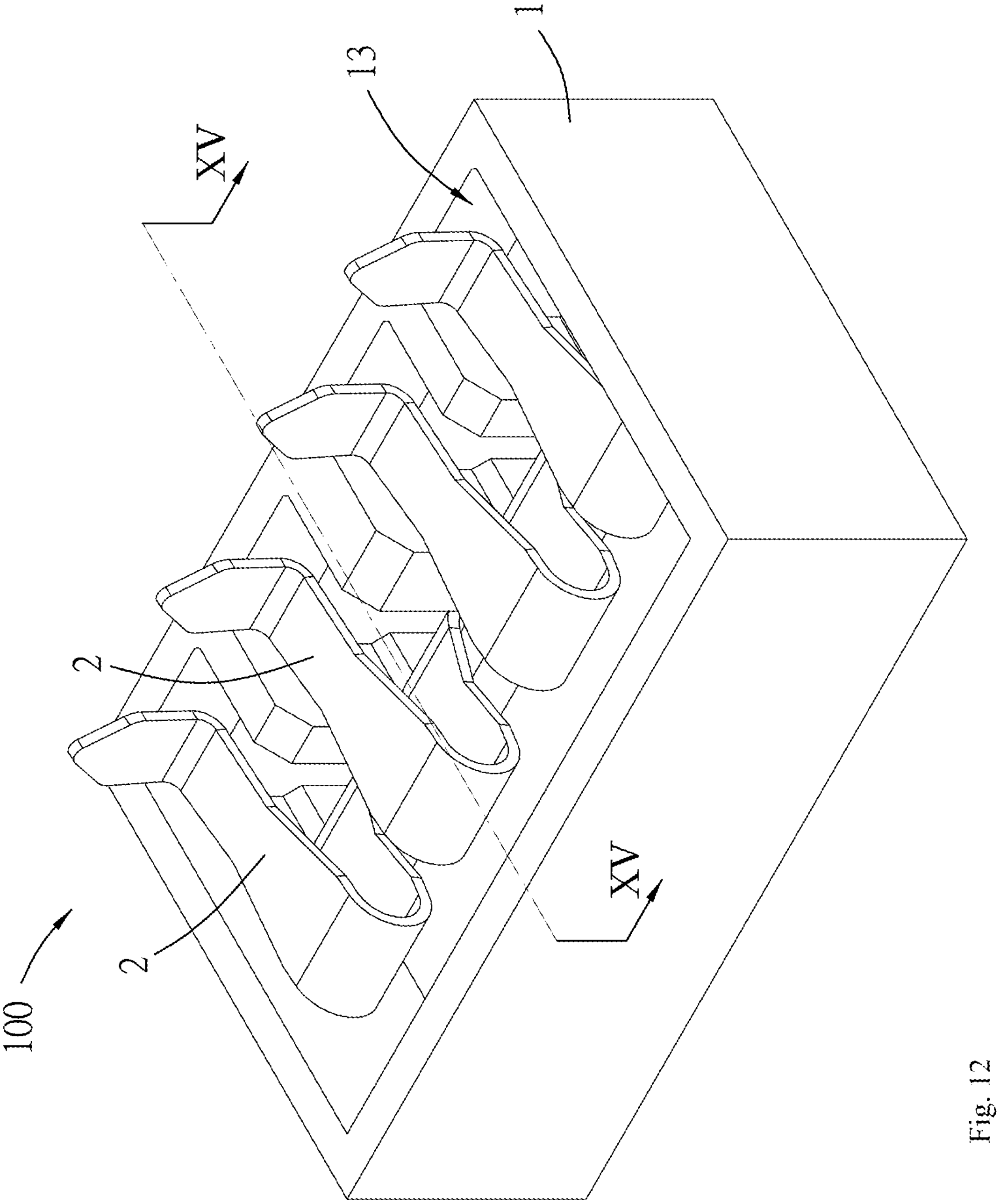
FIG. 12 is a partial perspective view of a second embodiment of the receptacle connector of the present disclosure.
Figure 13:
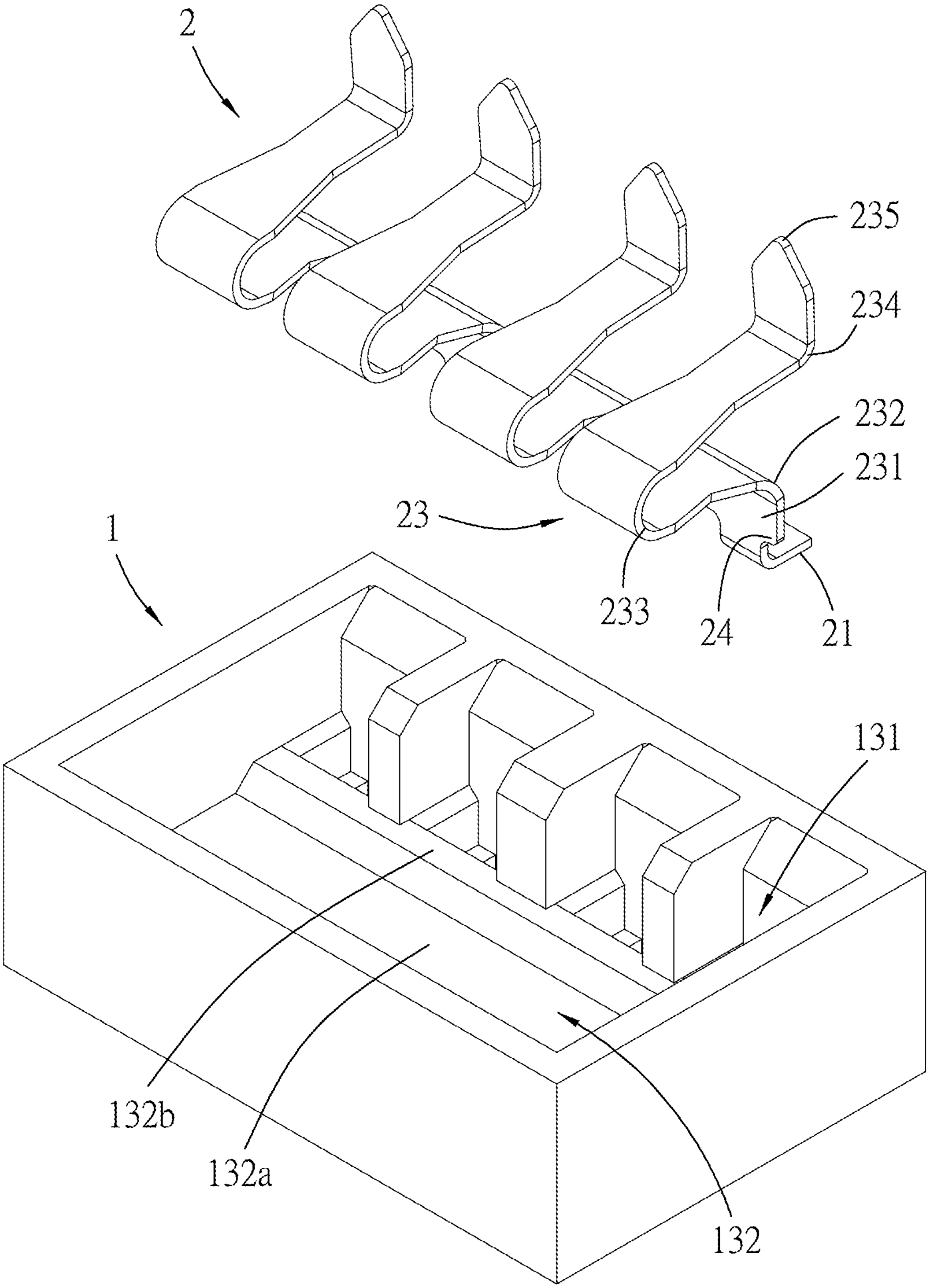
FIG. 13 is a partial perspective exploded view of the second embodiment.
Figure 14:
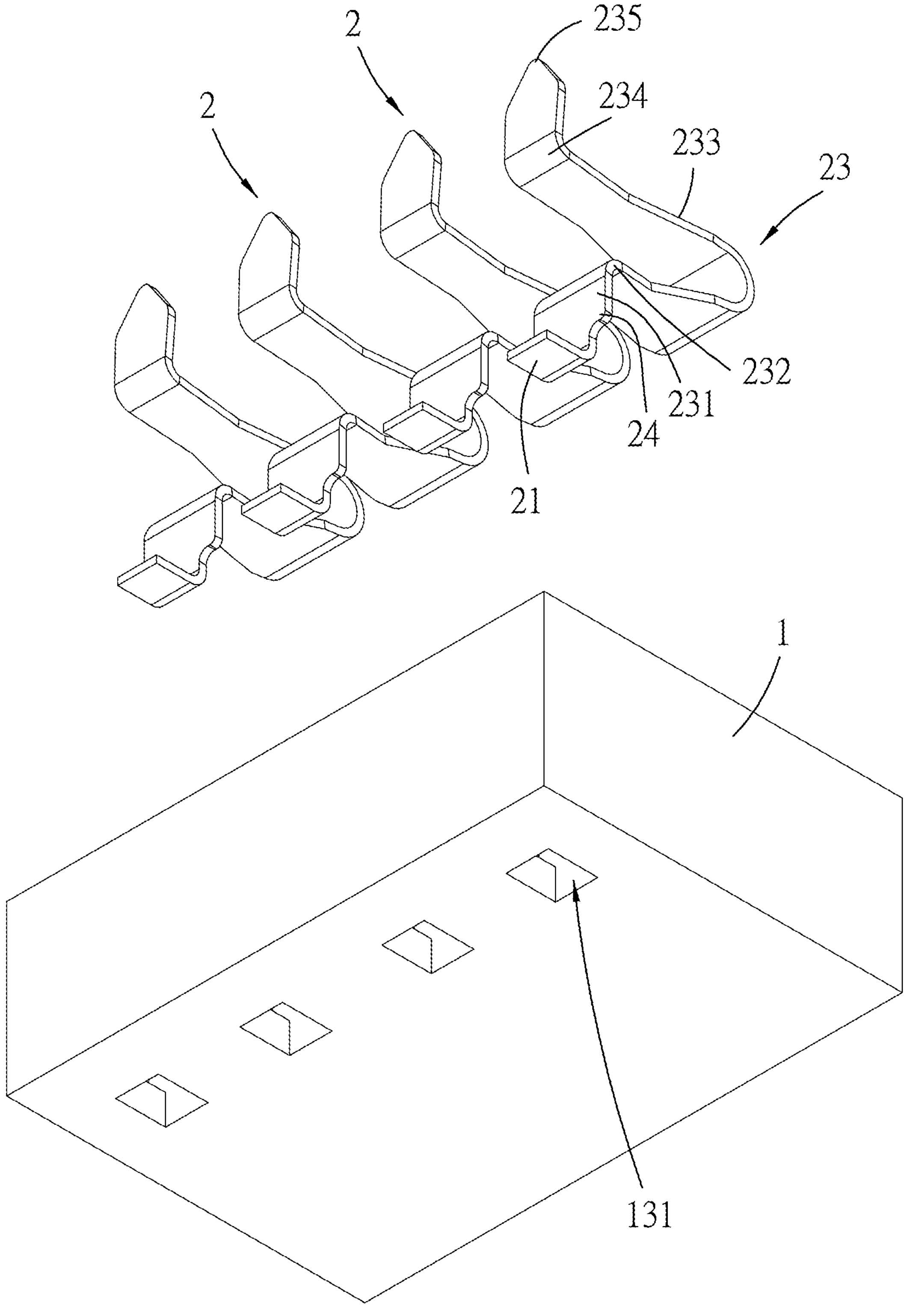
FIG. 14 is a perspective exploded view of FIG. 13 from another angle.
Figure 15:
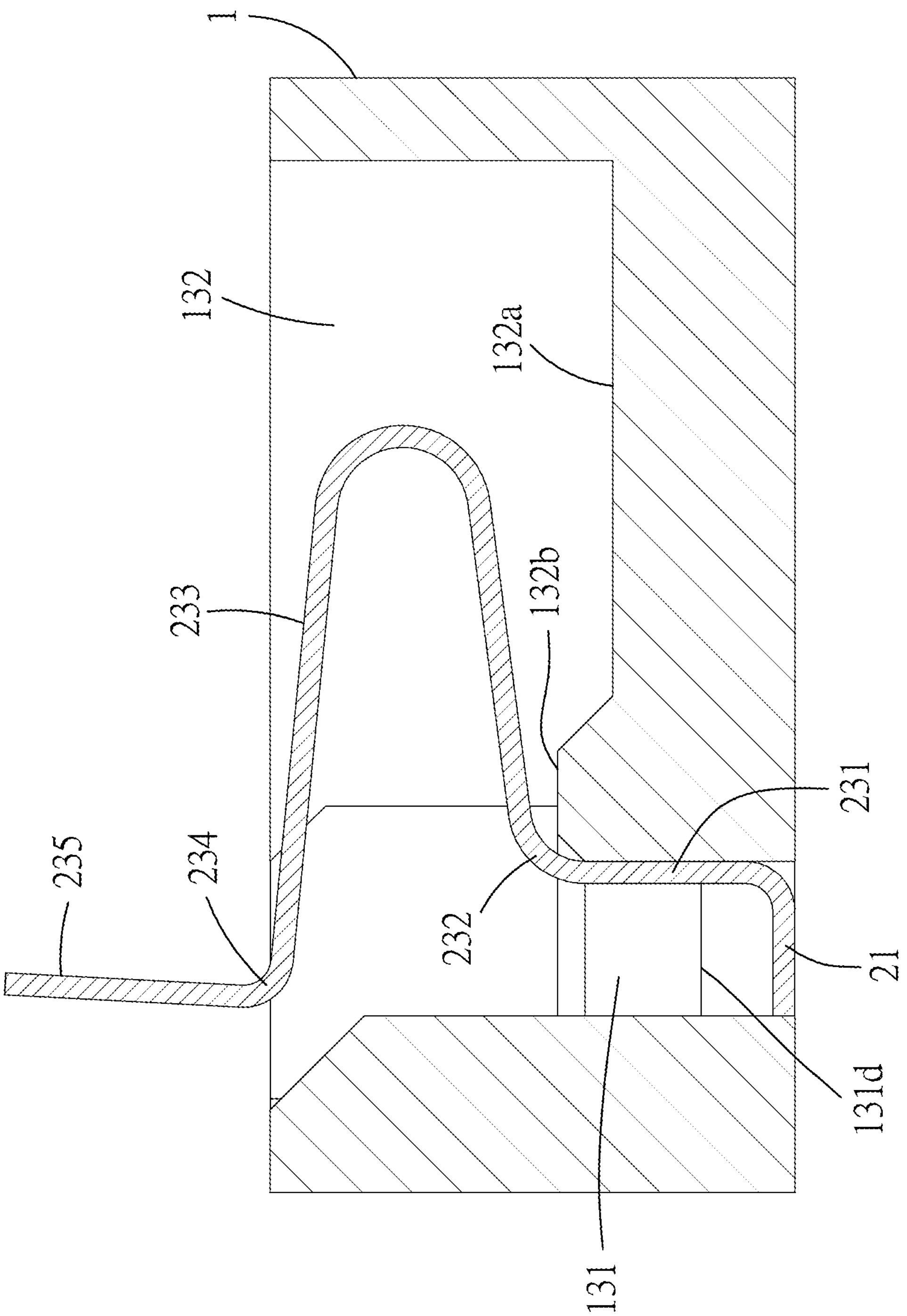
FIG. 15 is a partial cross sectional view taken along an XV-XV line of FIG. 12.

A shoulder portion 24 is formed at each of at least one side edge of two side edges of each of at least one of the upright arm 22 and the bending arm 23, the two side edges are connected with the soldering segment 21, the shoulder portion 24 protrudes relative to a corresponding side edge of the soldering segment 21, in the present embodiment, the two side edges, which are connected with the soldering segment 21, of each of the upright arm 22 and the bending arm 23 each form a shoulder portion 24 which protrudes relative to the corresponding side edge of the soldering segment 21, the shoulder portion 24 of the bending arm 23 is positioned at a location where the abutting segment 231 and the soldering segment 21 are connected. When the terminal 2 is provided to the corresponding terminal groove 13, the soldering segment 21 is adjacent to the bottom face 11, the abutting segment 231 abuts against the third side wall face 131*c* and the upright arm 22 abuts against the second side wall face 131*b*, so that the terminal 2 has a preloaded force, the two shoulder portions 24 of the upright arm 22 respectively press against the two step portions 131*d* (see FIG. 10), the two shoulder portions 24 of the bending arm 23 also respectively press against the two step portions 131*d* (see FIG. 11), so that the terminal 2 is firmly positioned in the terminal groove 13. Moreover, the shoulder portion 24 is formed at the abutting segment 231 increases a width of the abutting segment 231, which may lower impedance so as to increase signal integrity performance.

The contact segment 235 is positioned above the upright arm 22 and makes the upper bending segment 234 contact the upright arm 22 when the contact segment 235 is pressed down to move downwardly. In the present embodiment, a tip of the upright arm 22 obliquely extends upwardly away from the bending arm 23 to form an oblique end portion 221 which allows the upper bending segment 234 to press against when the upper bending segment 234 is pressed down. A width of the oblique end portion 221 is larger than a width of the upper bending segment 234, so at to ensure that the upper bending segment 234 can indeed contact the oblique end portion 221 to form an electrical connection.

The elastic bending segment 233 enters into the accommodating groove portion 132, and the lower bending segment 232 is close to the protruding portion 132*b*, when the contact segment 235 is pressed down, the contact segment 235 also will bring the elastic bending segment 233 to move, by that the protruding portion 132*b* supports the lower bending segment 232, the elastic bending segment 233 approaching or contacting the bottom wall face 132*a* can be avoided, therefore it avoids transferring speed of the elastic bending segment 233 becoming slower because the elastic bending segment 233 approaches or contacts the insulative housing 1 (plastic).

Referring to FIG. 12 to FIG. 15, a second embodiment of the receptacle connector 100 of the present disclosure differs from the first embodiment in that, in the second embodiment, each terminal 2 does not have the upright arm 22 and the soldering segment 21 does not have the first end portion 211 connected with the upright arm 22, all other configurations are the same as those of the first embodiment and are not repeatedly described herein.

However, the above description is only for the embodiments of the present disclosure and it is not intended to limit the implementing scope of the present disclosure, and the simple equivalent changes and modifications made according to the claims and the contents of the specification are still included in the scope of the present disclosure. As such, numerous other embodiments, modifications and variations within the scope and spirit of the appended claims will occur to persons of ordinary skill in the art from a review of this disclosure.

What is claimed is:

1. A terminal comprising:

a soldering segment having a soldering portion and a first end portion and a second end portion which are respectively positioned at opposite two ends of the soldering portion and extend upwardly;

an upright arm extending upwardly from the first end portion;

a bending arm having an abutting segment which extends upwardly from the second end portion, a lower bending segment which bends and obliquely extends upwardly from the abutting segment away from the upright arm, an elastic bending segment which first extends from the lower bending segment away from the upright arm and then bends back and obliquely extends upwardly close to the upright arm, an upper bending segment which bends and extends upwardly from the elastic bending segment and a contact segment which extends upwardly from the upper bending segment; and a shoulder portion being formed at each of at least one side edge of two side edges of each of at least one of the upright arm and the bending arm, the two side edges being connected with the soldering segment, the shoulder portion protruding relative to a corresponding side edge of the soldering segment.

2. The terminal of claim 1, wherein the shoulder portion is formed at each of the two side edges of each of the at least one of the upright arm and the bending arm, the two side edges are connected with the soldering segment, the shoulder portion protrudes relative to the corresponding side edge of the soldering segment.

3. The terminal of claim 1, wherein the shoulder portion is formed at each of the at least one side edge of the two side edges of each of the upright arm and the bending arm, the two side edges are connected with the soldering segment, the shoulder portion protrudes relative to the corresponding side edge of the soldering segment.

4. The terminal of claim 1, wherein the shoulder portion is formed at each of the two side edges of each of the upright arm and the bending arm, the two side edges are connected with the soldering segment, the shoulder portion protrudes relative to the corresponding side edge of the soldering segment.

5. The terminal of claim 1, wherein the contact segment is positioned above the upright arm and makes the upper bending segment contact the upright arm when the contact segment is pressed down to move downwardly.

6. The terminal of claim 5, wherein a tip of the upright arm obliquely extends upwardly away from the bending arm to form an oblique end portion which allows the upper bending segment to press against when the upper bending segment is pressed down.

7. The terminal of claim 6, wherein a width of the oblique end portion is larger than a width of the upper bending segment.

8. The terminal of claim 1, wherein the soldering portion has a soldering face which faces downwardly and is used to be soldered with a tin ball.

9. A receptacle connector comprising:

an insulative housing having a bottom face, a top face opposite to the bottom face and a plurality of terminal grooves, each terminal groove having a positioning groove portion which penetrates the bottom face and the top face and an accommodating groove portion which extends transversely from the positioning groove portion and penetrates the top face, and a wall face which defines the positioning groove portion comprising two first side wall faces which face each other and are spaced apart from each other, a second side wall face which connects one side of each of the two the first side wall faces and a third side wall face which connects the two first side wall face, faces the second side wall face and is spaced apart from the second side wall face, at least one of the two first side wall faces forming a step portion, which protrudes, at a position where the at least one of the two first side wall faces is close to the bottom face, a height of the third side wall face being lower than a height of the second side wall face so as to make the positioning groove portion and the accommodating groove portion communicated with each other, a wall face which defines the accommodating groove portion comprising a bottom wall face which faces the top face and is connected with the third side wall face, and the bottom wall face forming a protruding portion at a position where the bottom wall face is adjacent to the third side wall face; and a plurality of terminals respectively provided to the plurality of terminal grooves, each terminal comprising a soldering segment adjacent to the bottom face and a bending arm, the bending arm having an abutting segment which extends upwardly from one end of the soldering segment and is adjacent to the third side wall face, a lower bending segment which bends and obliquely extend upwardly from the abutting segment toward the accommodating groove portion and is close to the protruding portion, an elastic bending segment which first extends from the lower bending segment away from the second side wall face and then bends back and obliquely extends upwardly close to the second side wall face, an upper bending segment which bends and extend upwardly from the elastic bending segment and a contact segment which extends upwardly from the upper bending segment, a shoulder portion which protrudes relative to a corresponding side edge of the soldering segment being formed to each of at least one side edge of two side edges of the abutting segment which are connected with the soldering segment, and the shoulder portion pressing against the corresponding step portion to be positioned.

10. The receptacle connector of claim 9, wherein the two first side wall faces each form one step portion, which protrudes, at a position where each of the two first side wall faces is close to the bottom face, the shoulder portion which protrudes relative to the corresponding side edge of the soldering segment is formed to each of the two side edges of the abutting segment which are connected with the soldering segment, and the shoulder portions press against the corresponding step portions respectively to be positioned.

11. The receptacle connector of claim 9, wherein each terminal further comprises an upright arm which extends upwardly from the other end of the soldering segment and is adjacent to the second side wall face.

12. The receptacle connector of claim 11, wherein a shoulder portion which protrudes relative to a corresponding side edge of the soldering segment is formed to each of at least one side edge of two side edges of the upright arm which are connected with the soldering segment, and the shoulder portion of the upright arm presses against the corresponding step portion to be positioned.

13. The receptacle connector of claim 11, wherein the two first side wall faces each form one step portion, which protrudes, at a position where each of the two first side wall faces is close to the bottom face, the shoulder portion which protrudes relative to the corresponding side edge of the soldering segment is formed to each of the two side edges of the upright arm which are connected with the soldering segment, and the shoulder portion of the upright arm presses against the corresponding step portion to be positioned.

14. The receptacle connector of claim 11, wherein the abutting segment of each terminal abuts against the third side wall face and the upright arm of each terminal abuts against the second side wall face so that each terminal has a preloaded force.

15. The receptacle connector of claim 11, wherein a tip of the upright arm obliquely extends upwardly away from the bending arm to form an oblique end portion which allows the upper bending segment to press against when the upper bending segment is pressed down.

16. The receptacle connector of claim 15, wherein a width of the oblique end portion is larger than a width of the upper bending segment.

17. The receptacle connector of claim 9, wherein the soldering portion has a soldering face which faces downwardly and is used to be soldered with a tin ball.

18. A receptacle connector comprising:

an insulative housing having a first terminal providing portion, a second terminal providing portion and an isolation portion positioned between the first terminal providing portion and the second terminal providing portion, the first terminal providing portion, the second terminal providing portion and the isolation portion being distributed in a first direction; and a plurality of terminals distributed and provided to the first terminal providing portion, the second terminal providing portion and the isolation portion, the terminals provided to the first terminal providing portion and the terminals provided to the second terminal providing portion each comprising multiple terminal groups, each terminal group being constituted by four terminals which are arranged side by side along a second direction perpendicular to the first direction, the two terminals positioned at a middle of the four terminals acting as signal terminals and the two terminals positioned at outer sides of the four terminals acting as first ground terminals, the terminals provided to the isolation portion acting as second ground terminals.

19. The receptacle connector of claim 18, wherein the terminal provided to the first terminal providing portion and the terminal provided to the second terminal providing portion each are arranged as a plurality of terminal rows distributed in the first direction in which the terminals of each terminal row are arranged along the second direction, each terminal row comprises that the terminal groups are arranged along the second direction and are spaced apart from each other and positions of the terminal groups of adjacent terminal rows are staggered in the first direction, the second ground terminals provided to the isolation portion are divided into two rows, one row of the second ground terminals is adjacent to the first terminal providing portion, the other row of the second ground terminals is adjacent to the second terminal providing portion, and positions of the second ground terminals of the two rows are staggered in the first direction and each are spaced apart from the signal terminal of the terminal group which is near the corresponding second ground terminal by a certain distance.

20. The receptacle connector of claim 19, wherein each terminal row further has one terminal acted as a third ground terminal, the third ground terminals of adjacent terminal rows are respectively positioned at two opposite end sides in the second direction and each are spaced apart from the terminal groups of the same terminal row.

* * * * *